United States Patent Office 3,297,918
Patented Jan. 10, 1967

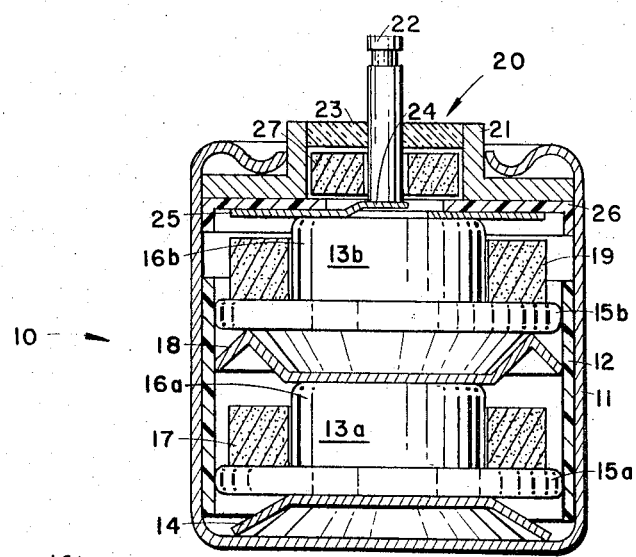
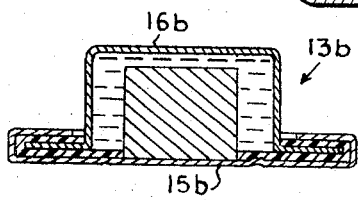
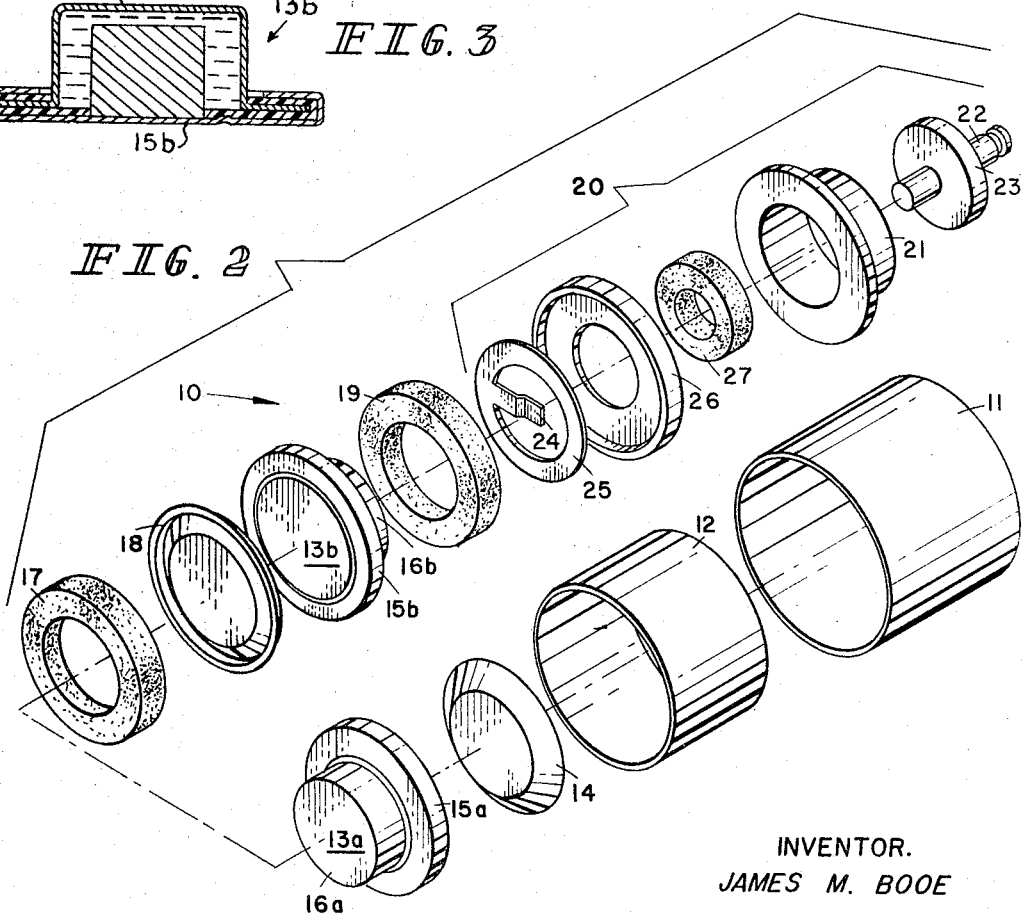
FIG. 1
FIG. 3
FIG. 2
INVENTOR.
JAMES M. BOOE
BY
ATTORNEY

3,297,918
ATMOSPHERE CONTROL WITHIN THE HERMETIC ENCLOSURE OF ELECTROLYTIC CAPACITOR ASSEMBLIES
James M. Booe, Indianapolis, Ind., assignor to P. R. Mallory & Co., Inc., Indianapolis, Ind., a corporation of Delaware
Filed Aug. 10, 1964, Ser. No. 388,537
15 Claims. (Cl. 317—230)

The present invention relates to electrolytic capacitors and more particularly relates to means for controlling the atmosphere within hermetically sealed enclosures for electrolytic capacitors.

In capacitor assemblies such as aluminum and tantalum electrolytic capacitors wherein gasket sealed cells are contained in an outer hermetically sealed enclosure, and particularly wherein the cells are connected in series, it is difficult to maintain high insulation resistance across the insulating member of the hermetic seal. This insulation problem is especially severe when electrolytic capacitors are contained within this type of enclosure, as moisture and acidic gases emerge from the individual cells through the gasket seals and accumulate inside the external hermetically sealed housing. The air within the external hermetically sealed enclosure and around the individual cells inside the enclosure becomes saturated with water vapor, and also becomes contaminated with volatile constituents from the electrolyte within the individual cells as a result of these constituents permeating the gasket seals of the individual cells. The gases from the electrolyte may vary considerably, depending upon the electrolyte composition, the temperature, and the extent of operation. In the case of aluminum electrolytic capacitors wherein ethylene glycol is a constituent of the electrolyte, certain volatile reduction products of the glycol may be formed which may be electrolytic in nature and when combined with the moisture content, produces a conducting electrolytic path across the insulator of the hermetic seal when the moisture condenses thereon.

In the case of liquid electrolyte tantalum capacitors employing cells having sintered or foil anodes, and especially when said cells are connected in a series arrangement for high voltage applications and operated at elevated temperatures, moisture and gases resulting from the decomposition of the electrolyte will contaminate the atmosphere surrounding the cells and within the hermetically sealed enclosure, as these gases permeate the gasket seals of the individual cells. This condition is particularly prevalent with cells having a sulfuric acid electrolyte. Upon operation, various acidic gases such as hydrogen sulfide and sulfur dioxide are known to be formed. When the atmosphere between the inner cells and the outer casing becomes contaminated with moisture and gases, a condition is established whereby the moisture will condense on the inner surfaces of the hermetically sealed enclosure and will dissolve the acidic gases causing corrosion of the construction parts. The condensation further takes place across the insulating glass or ceramic member of the hermetic seal, producing an electrically conducting path which is manifested as a large increase in the electrical leakage of the capacitor. This leakage across the insulator between the terminals being caused by an electrolyte, electrolytic corrosion will take place on the terminals.

It is known in the art to minimize this condition by providing a hole in the outer hermetically sealed casing during the aging process to vent out moisture and gases coming from the individual cells. After the aging process is completed, the vent is soldered shut. However, subsequent operations of the capacitor, particularly at elevated temperatures and over temperature excusions will liberate additional moisture and gases from the individual cells. This results in a high leakage condition across the terminal insulator thereby degrading the electrical characteristics of the capacitor.

It is therefore an object of the present invention to provide an improved means for minimizing or completely eliminating the effect of moisture and gases in electrolytic capacitors.

It is an object of the present invention to provide a means for minimizing the effects of moisture and gases in electrolytic capacitor assemblies having a plurality of capacitor cells therein.

It is an object of the present invention to employ chemical agents within the capacitor construction to minimize or completely eliminate the effects of moisture and gases in electrolytic capacitor assemblies.

The present invention in another of its aspects, relates to novel features of the instrumentalities of the present invention described therein for teaching the principal object of the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings.

The invention resides in the novel construction, combination, arrangement, and cooperation of elements as hereinafter described and more particularly as defined in the appended claims.

The appended drawings illustrate several novel and different embodiments of the present invention and constructed to function in the most advantageous mode devised for the practical application of the basic principals involved in the hereinafter described invention.

In the drawings:

FIGURE 1 is a cut away view of an electrolytic capacitor assembly containing the desiccating material.

FIGURE 2 is an exploded view of the electrolytic capacitor assembly.

FIGURE 3 is a cross sectional view of the capacitor shown in FIGURE 1.

Generally speaking, the present invention provides the means and methods for chemically eliminating the moisture and gases within a hermetically sealed capacitor assembly comprising a plurality of electrolytic capacitor cells within a corrosion resistant container. The chemical materials employed are capable of absorbing the corrosive gases liberated from the individual cells during operation as well as the moisture vapor. They are also capable of absorbing the carbon dioxide from the air, thus eliminating electrolytic conductivity from the source.

The agents to be employed are generally known as desiccating or dehydrating agents which may include silica gel, aluminum oxide, calcium sulfate, calcium oxide, strontium oxide, and barium oxide. The compounds most adaptable for this type of application are those which upon absorbing water vapor do not produce aqueous solutions of the compound which would be highly conductive, but rather would result in compounds which are dry and nonconducting.

Barium oxide, strontium oxide, calcium oxide, aluminum oxide and silica gel are suitable. If compounds which have an affinity for water but which liquefy and become conductive are utilized, the resulting solutions would migrate over the construction parts of the assembly producing chemical and electrochemical corrosion and further causing electrical leakage across the insulator of the terminal.

Although silica gel, aluminum oxide and anhydrous calcium sulfate are not in the above category, and although they are good desiccating agents, they do not possess the property of absorbing appreciable quantities of acidic gases such as sulfur trioxide, sulfur dioxide, hydrogen sulfide, carbon dioxide, and so forth. Therefore, the preferred compounds of the present invention are certain anhydrous basic compounds such as the oxides of the alkaline earth elements, barium, calcium and strontium. These compounds being basic or alkaline in nature having a strong affinity for the acid type of gases as well as a strong affinity for water vapor. One of the aforementioned compounds, barium oxide, is an extremely good desiccating agent, being far superior to silica gel and aluminum oxide and even to the powerful desiccant anhydrous magnesium perchlorate.

When barium oxide is prepared by the low temperature reduction of barium carbonate, a highly porous form of the material results which will reduce the moisture content of air to approximately .0006 milligram per liter as compared with silica gel, a commonly used desiccating agent, which reduces the moisture content of air to about 0.03 milligram per liter. Upon absorption of water vapor, the oxides of these alkaline earth metals are converted to the corresponding hydroxides which are also solid compounds and nonconductors.

In the practice of this invention, the desiccating material such as silica gel, aluminum oxide, anhydrous calcium sulfate and so-called molecular sieves but preferably the oxides of calcium, strontium and barium are incorporated into the capacitor structure occupying free void spaces between the cells and between the cells of the external casing. They may be employed either as the powdered material or granular material or in the form of discreet rigid shapes similar to those of the void spaces in the capacitor construction. If it is desired to incorporate the material in the capacitor structure as rigid discreet members, this can be accomplished by mixing the material in powdered form with a suitable binder and pressing to the desired shape. This, of course, must be done in an atmosphere devoid of moisture and carbon dioxide. Any binding material which is nonconductive, withstands operating temperatures, and is not chemically reactive with the desiccating material may be used.

Referring now to FIGURE 1 capacitor assembly 10, tubular case 11 which is composed of corrosion-resistant material such as stainless steel constitutes the side housing of the device and possess negative polarity. A cylindrical preformed liner 12 is disposed adjacent the inside diameter of case 11 to prevent electrical shorting of cells 13a and 13b with case 11. Beneath the lowest cell 13a in the vertical stack is positioned a bottom spring 14 which is of the metallic washer type. The outside diameter of bottom spring 25 is contiguous with the bore of tubular case 11. The capacitor cells 13a and 13b typically contain a porous anode of film-forming metal, an anodic head 15, a liquid electrolyte, a metal cathode 16 and a resilient electrolyte seal (not shown) serving also as an insulator between the anode 15 and the cathode 16. Vertical compression of cell 13 will cause the resilient seal to further resist electrolyte leakage.

Between cells 13a and 13b is placed a ring of desiccant and a metallic spring washer 18 which maintains the desired preload on the cells. Spring washer 18 is contoured to fit a corresponding concentric groove in the top of cell 13a and in this manner is radially piloted with respect to cell 13b. Surrounding cell 13b there is positioned a second ring of desiccant 19.

Upper terminal assembly 20 serves to close the upper opening of tubular case 11. The structural member of upper terminal assembly 20 is flanged collar 21 also composed of corrosion-resistant metal such as stainless steel. Within the bore of flanged collar 21 is disposed a positive terminal pin 22 which is preferably a nickel-iron alloy. Insulating body 23, a glass-like ring, is joined by fusion with flanged collar 21 and positive terminal pin 14 to form a glass-to-metal hermetic seal. Contiguous with the bottom of positive terminal pin 22 is finger 24 of contact disc 25, said finger 24 being resistance welded to pin 22. Mica washer 26 affords electrical insulation between flanged collar 21 and contact disc 25. A third ring of desiccant 27 is positioned in upper terminal assembly 20 to insure moisture and vapor absorption around the seal.

FIGURE 2 of the drawing presents an exploded view of the component parts which comprise electrolytic device 10 showing the interrelation of the component parts described in FIGURE 1.

The electrolytic capacitor assembly of the present invention as herein described in merely illustrative and not exhaustive in scope.

Since many widely different embodiments of the invention may be made without departing from the scope thereof, it is intended that all matter contained in the above description and shown in the accompanying drawings shall be interposed as illustrative and not in a limiting sense.

Having thus described my invention:

I claim:

1. An electrolytic capacitor assembly comprising a capacitor cell having a head of one polarity and a bottom means of the other polarity, an enclosure having said capacitor cell positioned therein and with an opening at one end thereof, the other end of said enclosure being closed, compressed spring means disposed between said closed end of said enclosure and said bottom means of said capacitor cell for maintaining a compressive force on said capacitor cell, said enclosure comprising insulative means for electrically separating the terminals of said capacitor cell, a terminal insulatively and heremtically sealed in the opening of said enclosure and an electrical conductor connecting said head of said capacitor cell to said terminal of the enclosure, a non-liquifying desiccating means disposed within said enclosure for substantially eliminating moisture and gases therein, and terminal means on the external side of said enclosure electrically connected to said bottom means of the capacitor cell.

2. An electrolytic capacitor assembly comprising a capacitor cell having a head of one polarity and a bottom means of the other polarity, an enclosure having said capacitor cell positioned therein and with an opening at one end thereof, the other end of said enclosure being closed, compressed spring means disposed between said closed end of said enclosure and said bottom means of said capacitor cell for maintaining a compressive force on said capacitor cell, said enclosure comprising insulative means for electrically separating the terminals of said capacitor cell, a terminal insulatively and heremtically sealed in the opening of said enclosure and an electrical conductor connecting said head of said capacitor cell to said terminal of the enclosure, a non-liquifying desiccating means disposed within said enclosure for eliminating moisture and gases therein and substantially occupying void spaces between said cell and said enclosure, said desiccating means selected from the group consisting of alkaline earth metals, and terminal means on the external side of said enclosure electrically connected to said bottom means of the capacitor cell.

3. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, desiccating means disposed within said enclosure for eliminating moisture and gases therein, and terminal means on the external side of said enclosure electrically connected to the other of said terminals of the capacitor.

4. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, a metallic enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, desiccating means disposed within said enclosure for eliminating moisture and gases therein, and terminal means on the external side of said enclosure electrically connected to the other of said terminals of the capacitor.

5. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, a metallic enclosure with said capacitor positioned therein and with an opening in a side thereof, compressed spring means disposed between a wall of said enclosure and a terminal of said capacitor for maintaining a compressive force on the resilient seal of the capacitor and electrically connecting a terminal of said capacitor to a wall of said enclosure, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, desiccating means disposed within said enclosure for eliminating moisture and gases therein, and terminal means on the external side of said enclosure electrically connected to the other of said terminals of the capacitor.

6. An electrolytic capacitor assembly comprising a plurality of capacitor cells each of said capacitor cells having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said plurality of capacitor cells positioned therein and with an opening in a side thereof, compressed spring means disposed between a wall of said enclosure and a terminal of each of said capacitor cells for maintaining a compressive force on the resilient seal of each of said capacitor cells, said enclosure comprising insulative means for electrically separating the terminals of said capacitor cells, a terminal insulatively and hermetically sealed in the opening of said enclosure and an electrical conductor connecting one of said terminals of a capacitor cell to said terminal of the enclosure, desiccating means disposed within said enclosure for eliminating moisture and gases therein, and terminal means on the external side of said enclosure electrically connected to the other terminal of one of the capacitor cells.

7. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, non-liquifying desiccating means disposed within said enclosure for eliminating moisture and gases therein, and terminal means on the external side of said enclosure electrically connected to the other of said terminals of the capacitor.

8. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, non-liquifying desiccating means disposed within said enclosure for eliminating moisture and gases therein, said desiccating means selected from the group consisting of the oxides of alkaline earth metals, and terminal means on the external side of said enclosure electrically connected to the other of said terminals of the capacitor.

9. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, non-liquifying desiccating means disposed within said enclosure for eliminating moisture and gases therein, said desiccating means selected from the group consisting of barium oxide, strontium oxide and calcium oxide, and terminal means on the external side of said enclosure electrically connected to the other of said terminals of the capacitor.

10. An electrolytic capacitor assembly comprising a capacitor having an anode and an electrolyte sealed within a conductive housing, said housing including an open ended container forming a first terminal of said capacitor and a conductive closure-cap as a second terminal thereof, an insulative resilient seal joining said closure-cap to the open end of the container, an enclosure with said capacitor positioned therein and with an opening in a side thereof, compressed spring means disposed between a wall of said enclosure and a terminal of said capacitor for maintaining a compressive force on the resilient seal of the capacitor, said enclosure comprising insulative means for electrically separating the terminals of said capacitor, a terminal insulatively and hermetically sealed in the opening of said enclosure and an electrical conductor connecting one of said terminals of the capacitor to said terminal of the enclosure, a plurality of ring-shaped desiccating means circumscribing said closure-cap for eliminating moisture and gases therein, said desiccating means selected from the group consisting of silica gel, aluminum oxide, calcium sulfate and molecular sieves, and terminal means on the external side of said enclosure electrically connected to the other of said terminals of the capacitor.

11. An electrolytic capacitor assembly comprising a plurality of capacitor cells having a head of one polarity and a container of the other polarity stacked in longitudinal succession within a conductive enclosure, said enclosure having an open end and a closed end, compressed spring means disposed between said closed end of said enclosure and said container of a first one of said capacitor cells and between successive ones of said cells for maintaining compresisve force between said capacitor cells, said enclosure being a terminal of said capacitor assembly, insulative liner means positioned around the inner periphery of said enclosure thereby isolating said capacitor cells from said enclosure, terminal assembly means being another terminal for said capacitor assembly and insulatively and hermetically sealing the opening of said enclosure and an electrical conductor biased against and connecting the head of the last one of said capacitor cells to said terminal means, the location of said electrical conductor controlling the magnitude of said compressive force, and desiccating means disposed within said enclosure for eliminating moisture and gases therein.

12. An electrolytic capacitor assembly comprising a plurality of capacitor cells having a head of one polarity and a container of the other polarity stacked in longitudinal succession within a conductive enclosure, said enclosure having an open end and a closed end, compressed spring means disposed between said closed end of said enclosure and said container of a first one of said capacitor cells and between successive ones of said cells for maintaining compressive force between said capacitor cells, said enclosure being a terminal of said capacitor assembly, insulative liner means positioned around the inner periphery of said enclosure thereby isolating said capacitor cells from said enclosure, terminal assembly means being another terminal for said capacitor assembly and insulatively and hermetically sealing the opening of said enclosure and an electrical conductor biased against and connecting the head of the last one of said capacitor cells to said terminal means, the location of said electrical conductor controlling the magnitude of said compressive force, and desiccating means eliminating moisture and gases therein and occupying void spaces between said cells and said enclosure and occupying void space juxtaposition said terminal assembly, said desiccating means selected from the group consisting of alkaline earth metals.

13. An electrolytic capactior assembly comprising a plurality of capacitor cells having a head of one polarity and a container of the other polarity stacked in longitudinal succession within a conductive enclosure, said enclosure having an open end and a closed end, compressed spring means disposed between said closed end of said enclosure and said container of a first one of said capacitor cells and between successive ones of said cells for maintaining compressive force between said capacitor cells, said enclosure being a terminal of said capacitor assembly, insulative liner means positioned around the inner periphery of said enclosure thereby isolating said capacitor cells from said enclosure, terminal assembly means being another terminal for said capacitor assembly and insulatively and hermetically sealing the opening of said enclosure and an electrical conductor biased against and connecting the head of the last one of said capacitor cells to said terminal means, the location of said electrical conductor controlling the magnitude of said compressive force, and desiccating means disposed within said enclosure for substantially eliminating moisture and gases therein and substantially occupying void spaces between said cells and said enclosure, said desiccating means selected from the group consisting of silica gel, aluminum oxide, calcium sulfate and molecular sieves.

14. An electrolytic capacitor assembly comprising a plurality of capacitor cells having a head of one polarity and a container of the other polarity stacked in longitudinal succession within a conductive enclosure, said enclosure having an open end and a closed end, compressed spring means disposed between said closed end of said enclosure and said container of a first one of said capacitor cells and between successive ones of said cells for maintaining compressive force between said capacitor cells, said enclosure being a terminal of said capacitor assembly, insulative liner means positioned around the inner periphery of said enclosure thereby isolating said capacitor cells from said enclosure, terminal assembly means being another terminal for said capacitor assembly and insulatively and hermetically sealing the opening of said enclosure and an electrical conductor biased against and connecting the head of the last one of said capacitor cells to said terminal means, the location of said electrical conductor controlling the magnitude of said compressive force, and desiccating means disposed within said enclosure for substantially eliminating moisture and gases therein and substantially occupying void spaces between said cells and said enclosure, said desiccating means selected from the group consisting of barium oxide, strontium oxide and calcium oxide.

15. An electrolytic capacitor assembly comprising a plurality of capacitor cells having a head of one polarity and a container of the other polarity stacked in longitudinal succession within a conductive enclosure, said enclosure having an open end and a closed end, compressed spring means disposed between said closed end of said enclosure and said container of a first one of said capacitor cells and between successive ones of said cells for maintaining compressive force between said capacitor cells, said enclosure being a terminal of said capacitor assembly, insulative liner means positioned around the inner periphery of said enclosure thereby isolating said capacitor cells from said enclosure, terminal assembly means being another terminal for said capacitor assembly and insulatively and hermetically sealing said enclosure, said terminal assembly including a collar means engaging with said enclosure and having a bore through which a terminal projects, body for insulating said collar means from said terminal and hermetically sealing said opening of said enclosure and an electrical conductor biased against and connecting the head of the last one of said capacitor cells to said terminal means, the location of said electrical conductor controlling the magnitude of said compressive force, and a plurality of ring-shaped desiccating means circumscribing said head of each of said capacitor cells and the portion of said terminal between said insulative body and said electrical conductor for substantially eliminating moisture and gases therein.

No references cited.

JAMES D. KALLAM, *Primary Examiner.*